(12) United States Patent
Prammer

(10) Patent No.: US 10,218,074 B2
(45) Date of Patent: Feb. 26, 2019

(54) DIPOLE ANTENNAS FOR WIRED-PIPE SYSTEMS

(71) Applicant: BAKER HUGHES INCORPORATED, Houston, TX (US)

(72) Inventor: Manfred G. Prammer, Downingtown, PA (US)

(*) Notice: Subject to any disclaimer, the term of this patent is extended or adjusted under 35 U.S.C. 154(b) by 421 days.

(21) Appl. No.: 15/185,925

(22) Filed: Jun. 17, 2016

(65) Prior Publication Data

US 2017/0012361 A1 Jan. 12, 2017

Related U.S. Application Data

(60) Provisional application No. 62/188,849, filed on Jul. 6, 2015.

(51) Int. Cl.
*H01Q 9/28* (2006.01)
*H04B 5/00* (2006.01)
(Continued)

(52) U.S. Cl.
CPC .............. *H01Q 9/285* (2013.01); *H01Q 9/26* (2013.01); *H04B 3/50* (2013.01); *H04B 5/0031* (2013.01); *H04B 5/0037* (2013.01)

(58) Field of Classification Search
CPC . H01Q 9/285; H01Q 9/26; H01Q 1/50; H04B 5/0031; H04B 5/0037; H04B 3/50; H02J 50/20
See application file for complete search history.

(56) References Cited

U.S. PATENT DOCUMENTS 2,000,716 A 5/1935 Polk
2,370,818 A 3/1945 Silverman
(Continued)

FOREIGN PATENT DOCUMENTS

EP 0481865 A1 4/1992
WO 2004113677 A1 12/2004
(Continued)

OTHER PUBLICATIONS

"DuPont Pyralux AP All-Polyimide Flexible Laminate," data sheet, Mar. 2001, DuPont Electronic Materials, Research Triangle Park, NC 27709-4425.
(Continued)

*Primary Examiner* — Jae Kim

(57) ABSTRACT

A system and method is provided for downhole wired-pipe communication and/or power transmission. The system includes first and second couplers each comprising a dielectric substrate, an electric dipole arranged on the dielectric substrate, a dielectric encapsulation surrounding the dielectric substrate and the electric dipole, and an electric shield surrounding the dielectric encapsulation. In operation, the electric dipoles are adapted to exchange radiofrequency signals and/or electrical power at radiofrequencies with each other by means of near-field dipole-dipole interaction. The one or more electric dipoles may be of the quarter-wavelength dipole type or of the half-wavelength dipole type. In a first embodiment, the dielectric substrate may form a generally circular ring and the coupler may be adapted to be rotatably movable against another coupler. In another embodiment, the dielectric substrate may form a generally linear structure and the coupler may be adapted to be linearly movable against another coupler.

39 Claims, 12 Drawing Sheets

(51) Int. Cl.
*H01Q 9/26* (2006.01)
*H04B 3/50* (2006.01)

(56) References Cited

U.S. PATENT DOCUMENTS

| | | | |
|---|---|---|---|
| 2,379,800 A | 7/1945 | Hare | |
| 3,090,031 A | 5/1963 | Lord | |
| 3,170,137 A | 2/1965 | Brandt | |
| 3,518,608 A | 6/1970 | Papadopoulos | |
| 3,713,089 A | 1/1973 | Clacomb | |
| 3,805,606 A | 4/1974 | Stelzer et al. | |
| 3,958,217 A | 5/1976 | Spinnler | |
| 4,087,781 A | 5/1978 | Grossi et al. | |
| 4,215,426 A | 7/1980 | Klatt | |
| 4,220,381 A | 9/1980 | Van Der Graaf | |
| 4,266,606 A | 5/1981 | Stone | |
| 4,283,779 A | 8/1981 | Lamel | |
| 4,375,310 A | 3/1983 | Robinson et al. | |
| 4,387,372 A | 6/1983 | Smith et al. | |
| 4,445,734 A | 5/1984 | Cunningham | |
| 4,605,268 A | 8/1986 | Meador | |
| 4,647,941 A | 3/1987 | Myer | |
| 4,788,544 A | 11/1988 | Howard | |
| 4,792,802 A | 12/1988 | Meadows | |
| 4,914,433 A | 4/1990 | Galle | |
| 5,122,662 A | 6/1992 | Chen et al. | |
| 5,589,825 A | 12/1996 | Pomerleau | |
| 6,123,561 A | 9/2000 | Turner et al. | |
| 6,392,317 B1 | 5/2002 | Hall et al. | |
| 6,670,880 B1 | 12/2003 | Hall et al. | |
| 6,727,707 B2 | 4/2004 | Sinclair et al. | |
| 6,821,147 B1 | 11/2004 | Hall et al. | |
| 6,830,467 B2 | 12/2004 | Hall et al. | |
| 6,913,093 B2 | 7/2005 | Hall et al. | |
| 6,945,802 B2 | 9/2005 | Hall et al. | |
| 6,958,704 B2 | 10/2005 | Vinegar et al. | |
| 6,968,611 B2 | 11/2005 | Hall et al. | |
| 6,981,546 B2 | 1/2006 | Hall et al. | |
| 6,982,384 B2 | 1/2006 | Hall et al. | |
| 6,991,035 B2 | 1/2006 | Hall et al. | |
| 6,992,554 B2 | 1/2006 | Hall et al. | |
| 7,017,667 B2 | 3/2006 | Hall et al. | |
| 7,019,665 B2 | 3/2006 | Hall et al. | |
| 7,025,130 B2 | 4/2006 | Bailey et al. | |
| 7,040,003 B2 | 5/2006 | Hall et al. | |
| 7,041,908 B2 | 5/2006 | Hall et al. | |
| 7,053,788 B2 | 5/2006 | Hall et al. | |
| 7,064,676 B2 | 6/2006 | Hall et al. | |
| 7,069,999 B2 | 7/2006 | Hall et al. | |
| 7,080,998 B2 | 7/2006 | Hall et al. | |
| 7,091,810 B2 | 8/2006 | Hall et al. | |
| 7,093,654 B2 | 8/2006 | Hall et al. | |
| 7,096,961 B2 | 8/2006 | Clark et al. | |
| 7,098,767 B2 | 8/2006 | Hall et al. | |
| 7,098,802 B2 | 8/2006 | Hall et al. | |
| 7,114,970 B2 | 10/2006 | Head | |
| 7,116,199 B2 | 10/2006 | Hall et al. | |
| 7,142,129 B2 | 11/2006 | Hall et al. | |
| 7,190,280 B2 | 3/2007 | Hall et al. | |
| 7,193,526 B2 | 3/2007 | Hall et al. | |
| 7,193,527 B2 | 3/2007 | Hall et al. | |
| 7,198,118 B2 | 4/2007 | Hall et al. | |
| 7,200,070 B2 | 4/2007 | Hall et al. | |
| 7,201,240 B2 | 4/2007 | Hall et al. | |
| 7,207,396 B2 | 4/2007 | Hall et al. | |
| 7,224,288 B2 | 5/2007 | Hall et al. | |
| 7,228,902 B2 | 6/2007 | Oppelt | |
| 7,243,717 B2 | 7/2007 | Hall et al. | |
| 7,248,177 B2 | 7/2007 | Hall et al. | |
| 7,252,160 B2 | 8/2007 | Dopf et al. | |
| 7,253,745 B2 | 8/2007 | Hall et al. | |
| 7,268,697 B2 | 9/2007 | Hall et al. | |
| 7,275,597 B2 | 10/2007 | Hall et al. | |
| 7,276,910 B2 | 10/2007 | Prsha et al. | |
| 7,277,026 B2 | 10/2007 | Hall et al. | |
| 7,291,303 B2 | 11/2007 | Hall et al. | |
| 7,298,286 B2 | 11/2007 | Hall | |
| 7,299,867 B2 | 11/2007 | Hall et al. | |
| 7,362,235 B1 | 4/2008 | Normann et al. | |
| 7,400,262 B2 | 7/2008 | Chemali et al. | |
| 7,453,768 B2 | 11/2008 | Hall et al. | |
| 7,525,264 B2 | 4/2009 | Dodge | |
| 7,530,737 B2 | 5/2009 | Thompson et al. | |
| 7,535,377 B2 | 5/2009 | Hall et al. | |
| 7,777,644 B2 | 8/2010 | Madhavan et al. | |
| 7,806,191 B2 | 10/2010 | Braden et al. | |
| 7,852,232 B2 | 12/2010 | Hall et al. | |
| 7,916,092 B2 * | 3/2011 | Homan | H01Q 1/04 |
| | | | 343/719 |
| 8,033,329 B2 | 10/2011 | Montgomery et al. | |
| 8,049,506 B2 | 11/2011 | Lazarev | |
| 8,072,347 B2 | 12/2011 | Santoso et al. | |
| 8,109,329 B2 | 2/2012 | Bray et al. | |
| 8,115,495 B2 | 2/2012 | Harmon | |
| 8,118,093 B2 | 2/2012 | Hassell et al. | |
| 8,120,508 B2 | 2/2012 | Madhavan et al. | |
| 8,130,118 B2 | 3/2012 | Hall et al. | |
| 8,242,928 B2 | 8/2012 | Prammer | |
| 8,704,677 B2 | 4/2014 | Prammer | |
| 2003/0171109 A1 | 9/2003 | Ballweber et al. | |
| 2004/0104797 A1 | 6/2004 | Hall et al. | |
| 2004/0124994 A1 | 7/2004 | Oppelt | |
| 2004/0150533 A1 | 8/2004 | Hall et al. | |
| 2004/0217880 A1 | 11/2004 | Clark et al. | |
| 2005/0001735 A1 | 1/2005 | Hall et al. | |
| 2005/0024231 A1 | 2/2005 | Fincher et al. | |
| 2005/0207279 A1 | 9/2005 | Chemali et al. | |
| 2005/0212530 A1 | 9/2005 | Hall et al. | |
| 2006/0050820 A1 | 3/2006 | Kawada et al. | |
| 2006/0254764 A1 | 11/2006 | Zuilekom | |
| 2006/0260801 A1 | 11/2006 | Hall et al. | |
| 2007/0024217 A1 | 2/2007 | Dodge | |
| 2007/0229368 A1 * | 10/2007 | Hata | H01P 5/10 |
| | | | 343/700 MS |
| 2007/0247328 A1 | 10/2007 | Petrovic et al. | |
| 2007/0279063 A1 | 12/2007 | Beard | |
| 2008/0012569 A1 | 1/2008 | Hall et al. | |
| 2008/0180333 A1 | 7/2008 | Martiskainen et al. | |
| 2008/0253230 A1 | 10/2008 | Thompson et al. | |
| 2008/0285619 A1 | 11/2008 | Thompson et al. | |
| 2009/0032303 A1 | 2/2009 | Johnson | |
| 2009/0153424 A1 | 6/2009 | Ryou et al. | |
| 2010/0213942 A1 | 8/2010 | Lazarev et al. | |
| 2011/0102188 A1 | 5/2011 | Mehta et al. | |
| 2012/0176138 A1 | 7/2012 | Prammer | |
| 2013/0106615 A1 | 5/2013 | Prammer | |
| 2014/0056368 A1 * | 2/2014 | Nakayama | H01Q 21/28 |
| | | | 375/256 |
| 2014/0246237 A1 | 9/2014 | Prammer | |
| 2014/0367092 A1 | 12/2014 | Roberson et al. | |
| 2015/0024799 A1 * | 1/2015 | Swanson | H04R 1/46 |
| | | | 455/550.1 |

FOREIGN PATENT DOCUMENTS

| | | |
|---|---|---|
| WO | 2009143409 A2 | 11/2009 |
| WO | 2010078197 A1 | 7/2010 |

OTHER PUBLICATIONS

"High Performance Lithium Cell—Size 1/2 AAA P/N:4037 10-25-150," data sheet, Electrochem, Clarence, NY, Jan. 2006, 1 page.

"Recommended Practice for Drill Stern Design and Operating Limits—Addendum 1," Nov. 2003, American Petroleum Institute, API Publishing Services, Washington, DC., 30 pages.

"Specification for Rotary Drill Stern Elements—API Specification 7," 40th Edition, Nov. 2001, American Petroleum Institute, API Publishing Services, Washington, DC, 104 pages.

"TK-236," brochure, 2006, Tuboscope, Houston, TX 77051, 1 page.

"TK-34XT," brochure, 2006, Tuboscope, Houston, TX 77051, 2 pages.

(56) References Cited

OTHER PUBLICATIONS

American Petroleum Institute, "Specification for Rotary Drill Stem Elements—API Specification 7", 40th edition, Nov. 2001, API Publishing Services, Washington, DC, Fig. 16 and Table 16, pp. 24-25.

Arps, J.J. and Arps, J.L., "The Subsurface Telemetry Problem—A Practical Solution", Journal of Petroleum Technology, May 1964, pp. 487-493.

Bourgoyne, Jr. et al., "Applied Drilling Engineering", SPE Textbook Series, vol. 2, Society of Petroleum Engineers, Richardson, TX, 1991, Chapter 1: Rotary Drilling Process, 42 pages.

Denison, E.B., "High Data-Rate Drilling Telemetry System", Journal of Petroleum Technology, Feb. 1979, 31(2), 155-163.

Devereux, S., "Drilling Technology in Nontechnical Language", Penn Well Corp., Tulsa, OK, 1999, Chapter 5: Rig Selection and Rig Equipment, 22 pages.

Economides et al., "Petroleum Well Construction", Watters and Dunn-Norman, John Wiley & Sons, West Sussex, UK, 1998, Chapter 1: Introduction to Drilling and Well Completions, 28 pages.

Notification of Transmittal of the International Search Report and the Written Opinion of the International Searching Authority, or the Declaration; PCT/US2016/032652; dated Aug. 31, 2016; 12 pages.

Notification of Transmittal of the International Search Report and the Written Opinion of the International Searching Authority, or the Declaration; PCT/US2016/038029; dated Sep. 16, 2016; 8 pages.

Okubo, JP 2007208431 machine translation, Aug. 16, 2007, Copyright (C) 2007.

Patton, B.J. et al., "Development and Successful Testing of a ContinuousWave, Logging-While-Drilling Telemetry System," Journal of Petroleum Technology, Oct. 1977.

Pixton, D.S., "Very high-speed drill string communications network—Report# 41229R06", Novatek Engineering, Provo, UT, Mar. 2003, 10 pages.

Pixton, D.S., "Very high-speed drill string communications network—Report# 41229R14", Novatek Engineering, Provo, UT, Jun. 2005, 59 pages.

Pohlmann, Ken C., "Principles of Digital Audio," 6$^{th}$ Ed., McGraw-Hill, New York, 2011, Chapters 7 and 8, 123 pages.

Prammer et al., "Field Testing of an Advanced LWD Imaging Resistivity Tool", Society of Petrophysicists and Well-Log Analysts 48th Annual Loggings Symposium, Jun. 3-6, 2007, Austin, TX, 1-15.

Robinson, L.H., "Exxon completes wireline drilling data telemetry system", Oil & Gas Journal, Apr. 14, 1980, 137-149.

Seaton et al., "New MWD-Gamma system finds many field applications", Oil & Gas Journal, Feb. 21, 1983, 80-84.

Shokrollahi, A., "Raptor Codes", IEEE Transactions on Information Theory, Jun. 2006, 52(6), 2551-2567.

Gjerstad, et al. "Automatic Prediction of Downhole Pressure Surges in Tripping Operations" IPTC 16974, International Petroleum Technology Conference held in Beijing, China Mar. 26-28, 2013, 15 pages.

\* cited by examiner

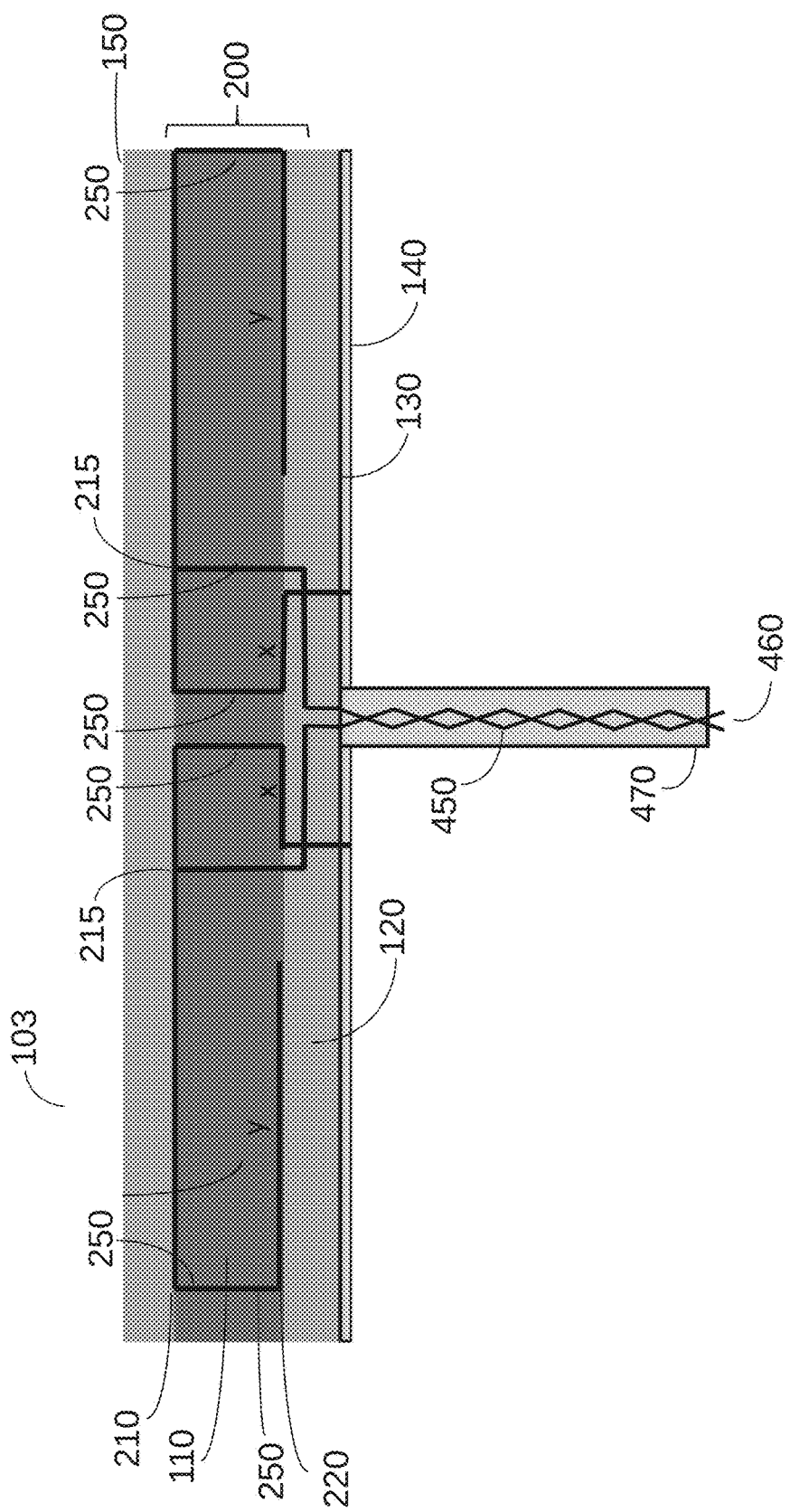

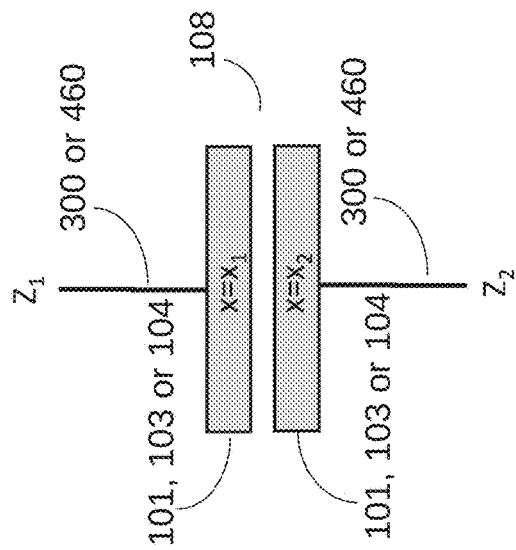
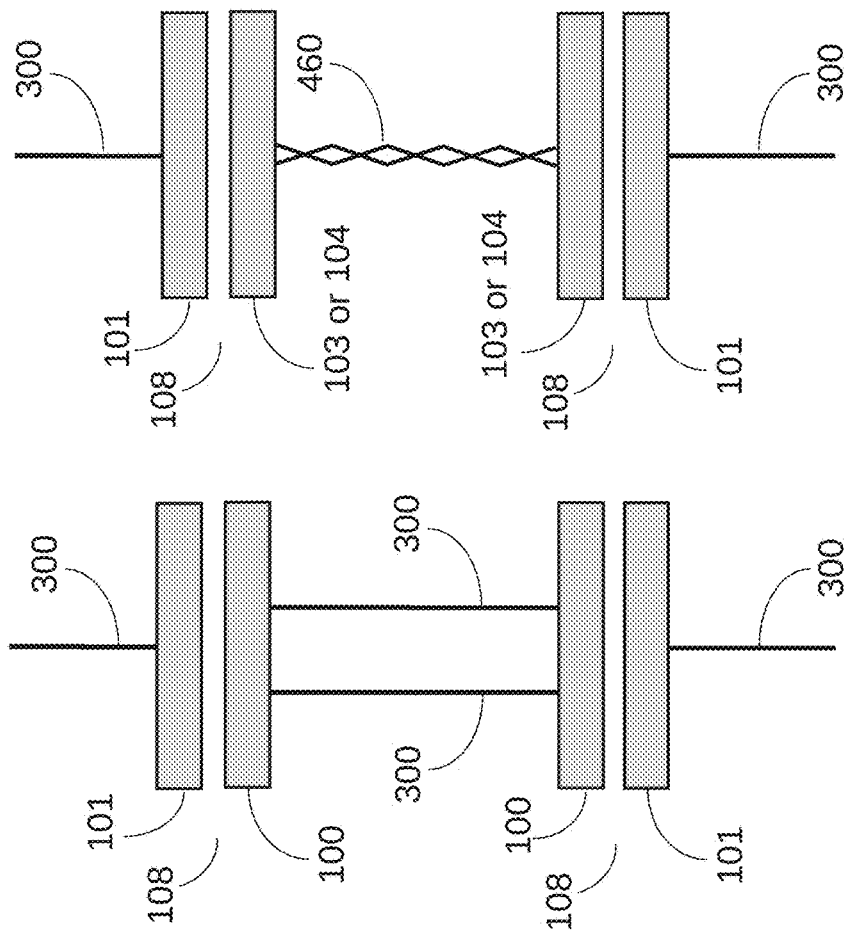
Fig. 8a  Fig. 8b  Fig. 8c

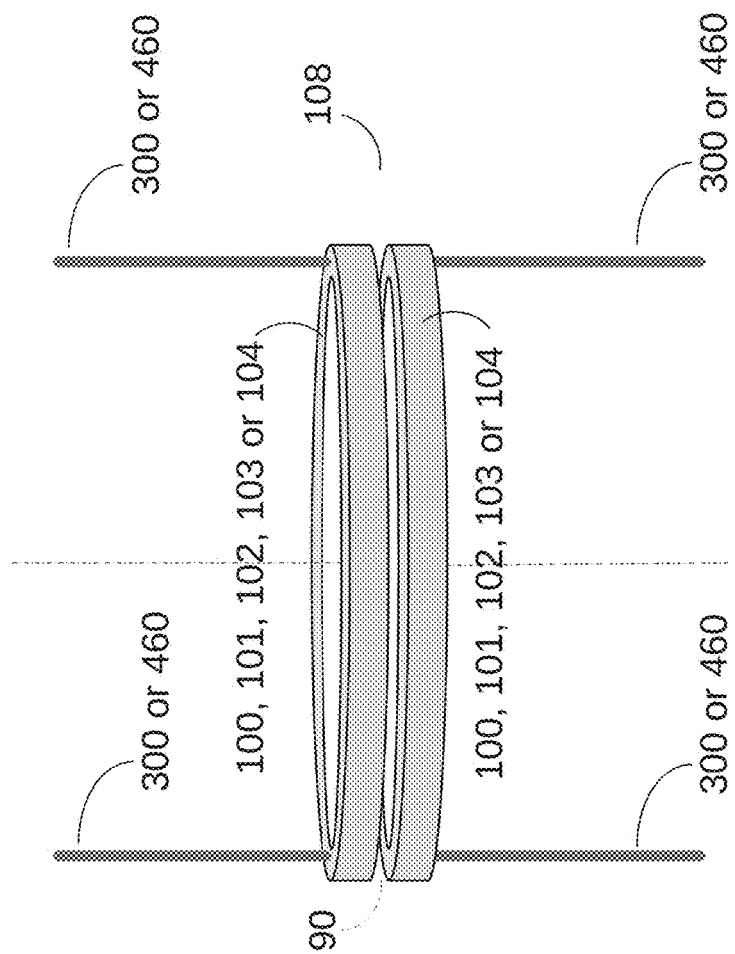

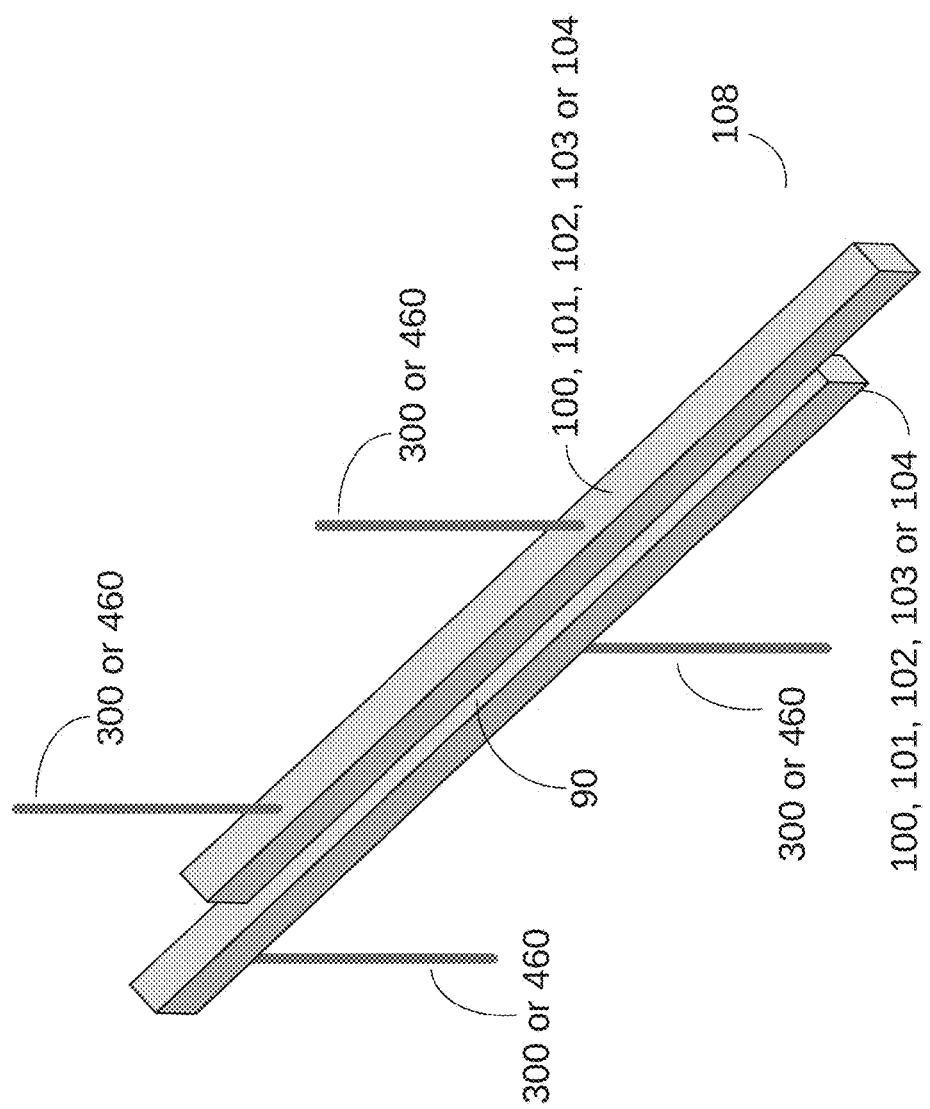

DIPOLE ANTENNAS FOR WIRED-PIPE SYSTEMS

CROSS-REFERENCE TO RELATED APPLICATIONS

This application claims priority to U.S. Provisional Patent Application Ser. No. 62/188,849, filed Jul. 6, 2015. The subject matter disclosed herein is also related to the subject matter disclosed in U.S. Pat. Nos. 8,242,928, 8,704,677, 8,941,384, and 9,133,707, as well as in U.S. Patent Publication No. 2013/0106615 (the "Prammer System" or "Prammer Systems"). The contents of these patents and patent applications are hereby incorporated by reference in their entireties.

TECHNICAL FIELD

The present application relates to the field of data transmission systems, in particular to data transmission systems suitable for downhole use, such as on a drill string used in oil and gas exploration, or on completion strings, or on casing strings. The system and method described herein are especially useful for obtaining downhole data or measurements while drilling as well as sending commands from the surface to downhole drilling equipment, downhole actuators or to other downhole instrumentation. In addition, the system and method described herein are also useful for supplying downhole instrumentation with electrical power.

BACKGROUND

The Prammer System allows communication and/or power transfer between surface equipment and downhole equipment and/or between different elements of downhole equipment. Downhole equipment may be located either close to a drill bit or anywhere else along a pipe string. The pipe string is comprised of many pipe joints that may be connected to each other via pin-and-box rotary connections. In an embodiment of the Prammer System, the box ends contain signal repeaters that compensate for the loss in signal amplitude along the cable segments spanning the pipe joints. Signals are communicated between pipe joints via electromagnetic resonance couplers that, being passive devices, also contribute to signal loss. The signal carrier frequency is typically located in the HF-to-UHF frequency range.

As described in the '384 patent, the electromagnetic resonance couplers comprise one or more antennas that may be printed on multi-layer laminates and may be arranged in a circular fashion, further comprising "capacitor blocks" that may be surface-mounted-devices (SMDs) embedded in the laminates. Generally, the purpose of these capacitors is many-fold. First, they cause electrical resonance by matching the physical length of the antenna segments to the electrical length required for resonance. Secondly, they match the high impedance of the resonant circuit to the much lower impedance of the attached one or more cable segments that typically have characteristic impedances of 50 Ohm or 75 Ohm.

The necessary presence of these capacitors complicates the manufacturing process and reduces the reliability of the couplers. The laminates may need to be hollowed out to house the capacitors, which may need to be glued in place and electrically connected, for example, by soldering and/or by means of electrically conductive glue. During operation, the capacitors are subjected to the full range of environmental conditions, including extreme downhole pressures and temperatures. It is unavoidable that mismatches exist between the thermal expansion characteristics of the ceramic material of the SMD capacitors and the thermal expansion characteristics of the laminate and also of the potting material, which may be epoxy-based or a thermoplastic such as polyaryletheretherketones (PEEK). These mismatches result in internal stresses, potentially leading to premature failures of the structures. It would be highly desirable to eliminate such thermal expansion mismatches.

The SMD capacitors also limit the power transmittable through a coupler. That power is limited by the voltage rating of the capacitors, which is typically 25 V or 50 V. The applied voltage must be further reduced if the capacitors are operated at the high end of their thermal ratings (typically 175° C. or 200° C.), which may be the case in a downhole environment. The maximum power P transferable through a coupler is given by $P=\text{sqrt}((Z*V)/(\text{sqrt}(2)*Q))$, where Z is the characteristic impedance of the cable, V is the peak voltage applied to the capacitors, and Q is the Q factor of the resonance. With typical values of $Z=50$ Ohm, $V=25$ V and $Q=5$, we find that the maximum transferable power is about 13 W. Given the temperature dependency, however, the maximum power should be kept below 10 W. It would be highly desirable to remove this power limitation and to be able to transfer power in excess of 10 W.

Thus, a need exists for a different coupler design, suitable for use in a wired-pipe downhole communications and/or power transmission system, without the need for discrete electronic components such as capacitors.

SUMMARY

A coupler design is provided that addresses the above-mentioned and other needs in the art by employing radiofrequency interaction between Hertzian ("electrical") dipoles. The dipoles can be of the quarter-wavelength type or of the half-wavelength type. Any number of dipoles may be located within a single coupler. The dipoles are folded in hitherto unknown shapes that enable low-loss communication and/or power transfer between dipoles using the near-field characteristics of such dipoles.

Furthermore, the dipoles may be folded in patterns that allow direct attachment of cables of standard characteristic impedances. Such "cable impedance matching" may be performed without the need for discrete components such as inductors, capacitors, transformers, baluns (balanced/unbalanced converters) and the like.

The dipoles may be tuned to operating frequencies in the HF, VHF or UHF bands. Such tuning may be performed without the need for discrete components such as inductors, capacitors, radiofrequency transformers, baluns and the like.

The dipoles may be arranged back-to-back to form a generally circular chain conforming to a generally circular coupler. The dipoles also may be arranged in linear fashion or may form any other shape desired. The coupler construction is characterized by the use of materials with similar mechanical and thermal characteristics, thereby maximizing overall resiliency under extreme downhole environmental stresses.

In exemplary embodiments, a signal and/or power coupler is provided for downhole wired-pipe communication and/or power transmission that includes one or more dielectric substrates, one or more electric dipoles arranged on the dielectric substrate(s), dielectric encapsulation surrounding the substrate(s) and the dipole(s), and one or more electric shields surrounding the encapsulation. In operation, the dipole(s) is/are adapted to exchange radiofrequency signals and/or electrical power at radiofrequencies with (an)other dipole(s) that is located within another coupler, by means of near-field dipole-dipole interaction. The one or more electric dipoles may be of the quarter-wavelength dipole type or of the half-wavelength dipole type. In a first embodiment, the dielectric substrate may form a generally circular ring and the coupler may be adapted to be rotatably movable against another coupler. In another embodiment, the dielectric substrate may form a generally linear structure and the coupler may be adapted to be linearly movable against another coupler.

These and other features and advantages will be apparent from the following detailed description of exemplary embodiments.

BRIEF DESCRIPTION OF THE DRAWINGS

FIG. 6a illustrates the use of unshielded or shielded twisted-pair cables with a coupler containing quarter-wavelength dipole antennas.

FIG. 8a illustrates coupler pairs with splitter/combiner functionality.

FIG. 8b illustrates coupler pairs with balanced/unbalanced transforming functionality.

FIG. 8c illustrates a coupler pair with impedance transforming functionality.

FIG. 9 illustrates a pair of circular couplers that are rotatably movable against each other.

FIG. 11 illustrates a pair of straight couplers that are linearly movable against each other.

DETAILED DESCRIPTION OF ILLUSTRATIVE EMBODIMENT

A detailed description of illustrative embodiments will now be described with reference to FIGS. 1-11. Although this description provides detailed examples of possible implementations of exemplary embodiments, it should be noted that these details are intended to be exemplary and in no way delimit the scope of the claims.

The system and method described herein makes use of the fact that the Prammer System operates at radiofrequencies, more specifically in the HF-to-UHF frequency range (3 MHz-3 GHz) and even more specifically in the VHF frequency band (30 MHz-300 MHz). It is well known in the art of radiofrequency antennas that dipoles of the Hertzian type ("electrical dipoles") are well suited to transmit at such frequencies. More specifically, Hertzian dipoles may be of the quarter-wavelength type or of the half-wavelength type. In the former case, one end of the dipole must be attached to earth potential or to an equivalent grounding point. It is further known in the art that the wave propagation speed on a dipole may be modified by encapsulating the dipole in a dielectric medium, which allows for changing the dipole's length and/or its spectral characteristics.

Without loss of generality, the dipoles may be implemented as copper traces on a suitable dielectric substrate. If a circular coupler structure is desired, the substrate may resemble a ring with approximately the same mean diameter as a groove housing the coupler. Suitable substrates have stable dielectric properties and low losses at radiofrequencies, such as polyimides, PTFE, PEEK, or the "RO" laminates manufactured by the Advanced Circuit Materials Division, Rogers Corporation, Chandler, Ariz.

Suitable encapsulating materials have stable dielectric properties and low losses at radiofrequencies, such as certain thermoplastics, e.g., polyimides, PTFE and PEEK, or elastomerics commonly used for downhole applications. Preferably, the substrates and encapsulations have similar dielectric and thermal expansion characteristics. Also, the range of relative dielectric permitivities (eps_r) is preferably about 2 to 5. As it is well known in the art, in the absence of magnetic material, electromagnetic wave propagation is slowed down by a factor sqrt(eps_r). Thus, electromagnetic resonant structures such as dipole antennas may be reduced in size by a factor sqrt(eps_r).

Figure 1:
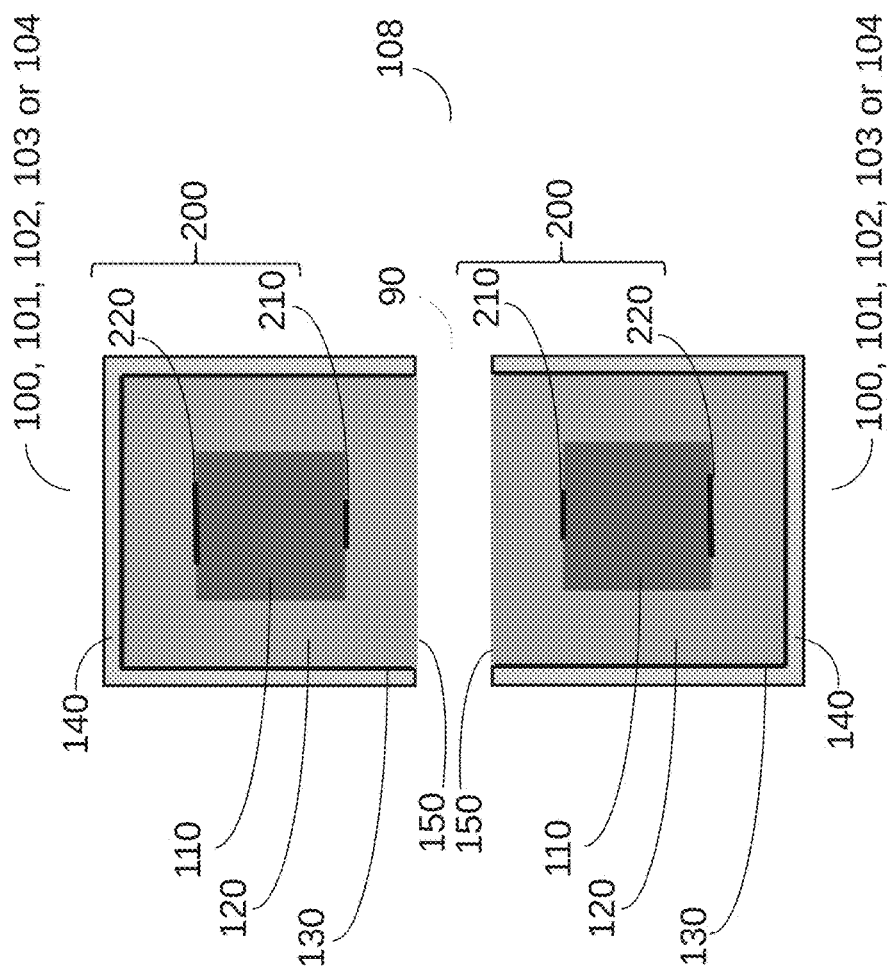
FIG. 1 illustrates a cross-sectional view of two couplers facing each other.

FIG. 1 provides in accordance with an exemplary embodiment a cross-sectional view of two couplers, each of the type 100, 101, 102, 103 or 104, forming a "coupler pair" 108, and facing each other across a gap 90. The couplers 100, 101, 102, 103, 104 could be straight along the axis in and out of the drawing plane or they could be bent in generally circular shapes. In general, the gap 90 would be fluid-filled and a few millimeters wide. The fluid could be air, gas, conducting or non-conducting liquids or any kind of fluid mixtures. In this view, the substrates 110, shown in dark shading, that may have square or rectangular cross sections, are visible as squares surrounded by the encapsulations 120, shown in light shading. As an example, typical cross-sectional dimensions may be: substrate 110: 3×3 mm; encapsulation 120: 5×5 mm. The dielectric substrates 110 may be machined from solid pieces of dielectric material. The dielectric substrates 110 may also be realized by build-up of laminates of non-, semi- or fully flexible dielectric material, as is the state of the art in printed-circuit technology. Without loss of generality, the encapsulations 120 may have a square, a rectangular, a semi-circle, a rounded or any other suitable cross section that exposes a generally flat front-face surface 150. The encapsulations 120 may be formed by any of the well-known methods for molding or potting thermoplastics and/or elastomerics and/or for otherwise forming permanent encasings.

The substrates 110 carry antenna structures 200. The structures 200 may be realized using standard techniques well-known in the art for depositing metal on non-metallic surfaces. For example, printed-circuit manufacturing steps deposit copper layers on dielectric substrates. Such copper layers are preferably passivated by a layer of gold. The structures 200 may also be cut from thin metal sheets and then permanently affixed to the substrates 110. The structures 200 are generally divided into front-facing structures 210 and rear-facing structures 220. In addition, side-facing structures 230 (not shown in FIG. 1) may be used. Front-facing 210 and rear-facing structures 220 may be electrically connected using side-facing structures and/or vias 250 (not shown in FIG. 1).

On each coupler 100 (or 101, 102, 103 or 104), one or more sides of the encapsulation 120 may carry a non-magnetic metallization layer 130. This metallization layer 130 acts as electromagnetic shield, confining all electromagnetic fields to within the space it encloses. The layer or shield 130 may be realized using techniques well-known in the art for depositing metal on non-metallic surfaces. Preferably, the non-magnetic shield 130 is of high electrical conductivity. The shield 130 may also be realized using a separate metallic body that encloses the encapsulation 120, in which case the shield 130 may also serve as mold for the encapsulation 120. The front faces 150 of each coupler 100, facing each other, are not metalized. Each coupler 100 may be embedded in a housing 140, which typically is made of steel, but could be of any other suitable material. The housing 140 may or may not be present and may or may not be identical to the shield 130. In case the housing 140 and the shield 130 are one and the same, the housing needs to be non-magnetic, i.e. has a relative magnetic permeability close to 1, and is preferably of high electrical conductivity.

Not shown in FIG. 1 are the attached cables 300 (FIG. 2) or 460 (FIG. 6). As shown in the following, couplers 100 (or 101, 102, 103, 104) are fitted with one or more signal and/or power cables 300 or 460 that deliver and/or carry away radiofrequency signals and/or radiofrequency energy. The couplers 100 (or 101, 102) are particularly suited for attachment of coaxial cables. In that case, the cable shield 310 is typically electrically connected to the coupler shield 130 and may also be electrically connected to the antenna structure 200. The inner coaxial conductor 320 is typically only connected to the antenna structure 200. The couplers 103 (or 104) are particularly suited for attachment of twisted-pair cables as will be further discussed in the context of FIG. 6.

As will be discussed in the following, the coupler types 100, 101, 102, 103 and 104 differ in their antenna structures 200 and in their cable attachments. Nevertheless, the field patterns of these couplers are shaped such that they are compatible with each other. This means that the upper coupler in FIG. 1 may be of the type 100, 101, 102, 103 or 104, while the lower coupler in FIG. 1 independently may also be of the type 100, 101, 102, 103 or 104. Therefore, five "same-type" combinations exist, namely 100-100, 101-101, 102-102, 103-103, 104-104 and the following "hybrid" combinations: 100-101, 100-102, 100-103, 100-104, 101-102, 101-103, 101-104, 102-103, 102-104, 103-104.

Figure 2:
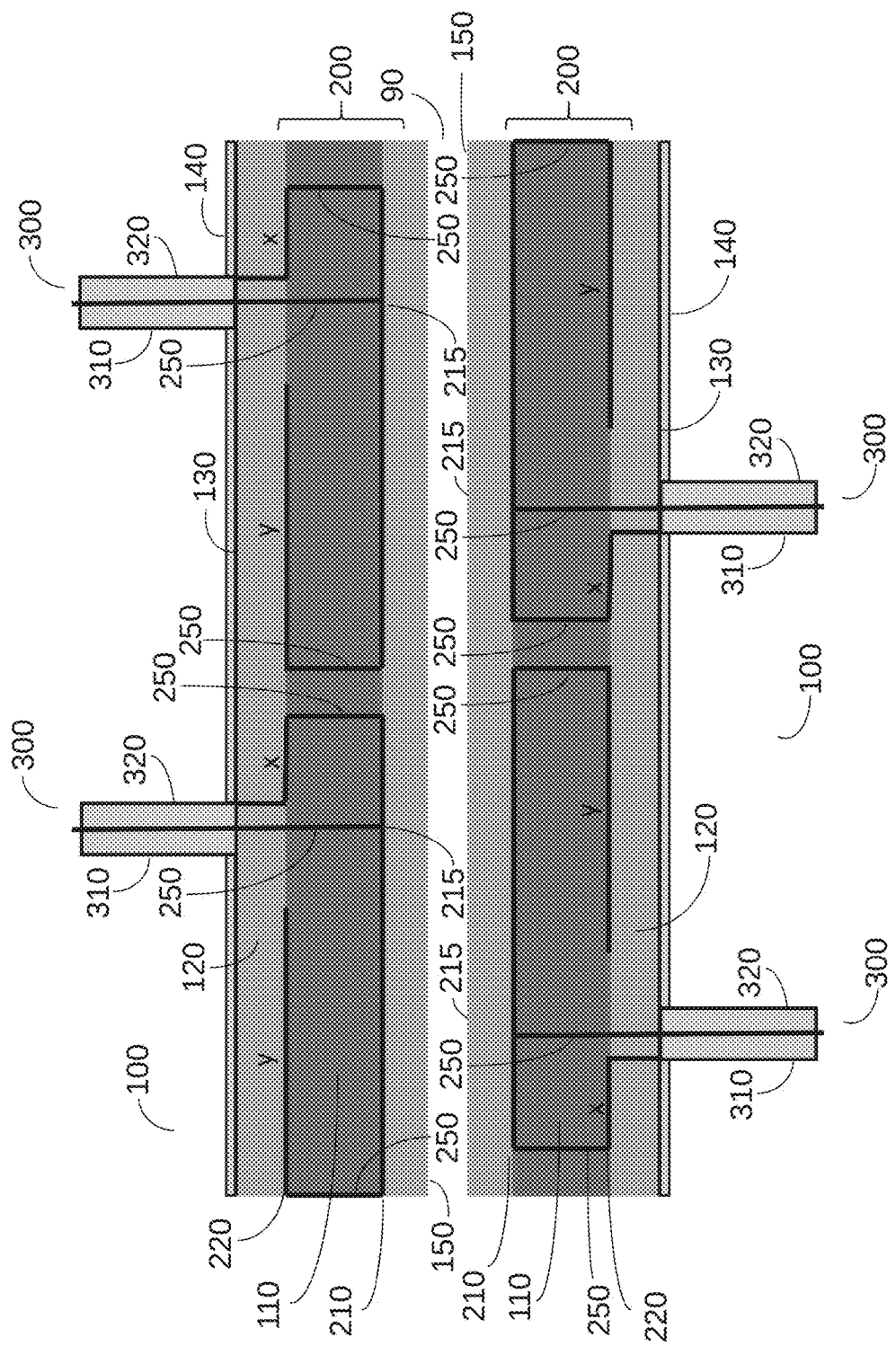
FIG. 2 illustrates a cross sectional view of two couplers facing each other, containing quarter-wavelength dipole antennas and interfacing to four coaxial cables.

Suitable antenna structures in accordance with an exemplary embodiment are illustrated in FIG. 2. FIG. 2 is essentially a sectioned side view of two couplers of type 100 facing each other across the gap 90. In the case of circular couplers 100, FIG. 2 may be interpreted as a flattened view. In that case, the left edge of FIG. 2 would be connected to its right edge. The exemplary embodiment shows two quarter-wavelength dipole antennas 200 within each coupler 100. The dipoles comprise both front-facing structures 210 as well as rear-facing structures 220. Front-facing and rear-facing structures are joined by means of vias 250 or via side-facing structures on the substrates 110 (not shown).

Together with the vias 250, the structures 210 and 220 form electrical paths that act as Hertzian ("electrical") dipoles. The structures marked "x" may be electrically connected both to the shields 130 as well as to the shields 310 of attached coaxial cables 300. The ends marked "y" remain unconnected (open circuits). The dipole lengths, which include the lengths "x" and "y," may be chosen such that the dipoles resonate at the desired operating frequency. Frequency tuning may be accomplished by adjusting the lengths and/or the widths of the rear-facing structures, labeled "y". Increasing the lengths "y" results in lower dipole resonance frequencies; decreasing the lengths "y" results in higher dipole resonance frequencies. Frequency tuning may also be accomplished by adjusting the lengths and/or the widths of the front-facing antenna structures 210. Frequency tuning may also be accomplished by adjusting the dielectric constant(s) of the substrates 110 and/or the encapsulations 120. Such adjustment of the dielectric constant(s) may be accomplished by "loading" a thermoplastic such as PEEK with ballast material(s) with different dielectric constant(s).

The attached cables 300 are typically of one of several standard characteristic impedances. The cables may have a characteristic impedance of 50 Ohm or may have a characteristic impedance of 75 Ohm. Other values for the characteristic impedance are also possible. Matching the dipoles' input/output impedances to the impedances of the attached cables 300 is accomplished by adjusting the lengths and/or the widths of the rear-facing structures, labeled "x". Increasing the size of the conducting loops associated with "x" (i.e. increasing the lengths "x") results in higher impedances; reducing the loop sizes by decreasing the lengths "x" results in lower impedance. The range of possible adjustments is about 20 Ohm to 100 Ohm, which covers all commercial types of coaxial cable. The cable shields 310 are attached to the coupler shields 130 that in turn are connected to the structures 220. The cables' inner connectors 320 are electrically connected to the structures 210 at the attachment points 215 by means of vias 250. Changing the parameter "x" moves the attachment points 215 along the front-facing structures 210.

It should be understood that the parameters "x" and "y" are not independent of each other. In fact, "x" has some influence on the dipole resonant frequency (operating frequency), while "y" has some influence on the cable matching characteristic. It is advisable to adjust "x" first for the cable impedance and then "y" for the operating frequency. This should be followed by fine-adjusting "x" again, followed by fine-adjusting "y".

In the exemplary arrangement shown in FIG. 2, paired cables 300 carry identical signals. This is particularly advantageous in cases where redundancy is desired. If one of the paired cables fails, the signal would still reach its destination through the remaining, intact cable. Similarly, if one dipole antenna structure were to fail, the signal would still reach its destination through the remaining, intact antenna/cable combination.

FIG. 2 has been drawn to visualize the spatial periodicity in the arrangement of dipole antennas 200 on the substrates 110. It is a trivial to generalize FIG. 2 to cases of arbitrary numbers of dipoles, starting at one dipole per coupler. If there is only one dipole per coupler, cables are no longer "paired"; if there are more than two dipoles per coupler, cables are "bundled". Within a bundle of cables that are all attached to the same coupler 100, the normal case (i.e., no failure has occurred) would be that all cables carry essentially identical copies of the same signal. If a failure occurs in a dipole and/or in a cable 300, the signal still reaches its destination by means of the remaining, intact antenna/cable combination(s).

It should be noted that opposing dipoles, i.e. antenna structures 200 on opposing couplers 100 facing each other across the gap 90, are generally not aligned with each other, as shown in FIG. 2 and in the following FIGS. 3 and 4. The fields associated with the dipoles are shaped such that any relative lateral translation between couplers (which changes to any relative azimuthal rotation between circular couplers) does not materially affect the short-range, near-field electromagnetic coupling between couplers forming a coupler pair, as long as, as noted above, bundled cables 300, when attached to couplers of type 100, carry identical signals. As shown below, this latter restriction also applies to couplers of type 101. Couplers of type 102, on the other hand, require that within a cable bundle, one-half of the cables carry straight signal copies and one-half of the cables carry complemented, i.e. phase-reversed signal copies.

Figure 3:
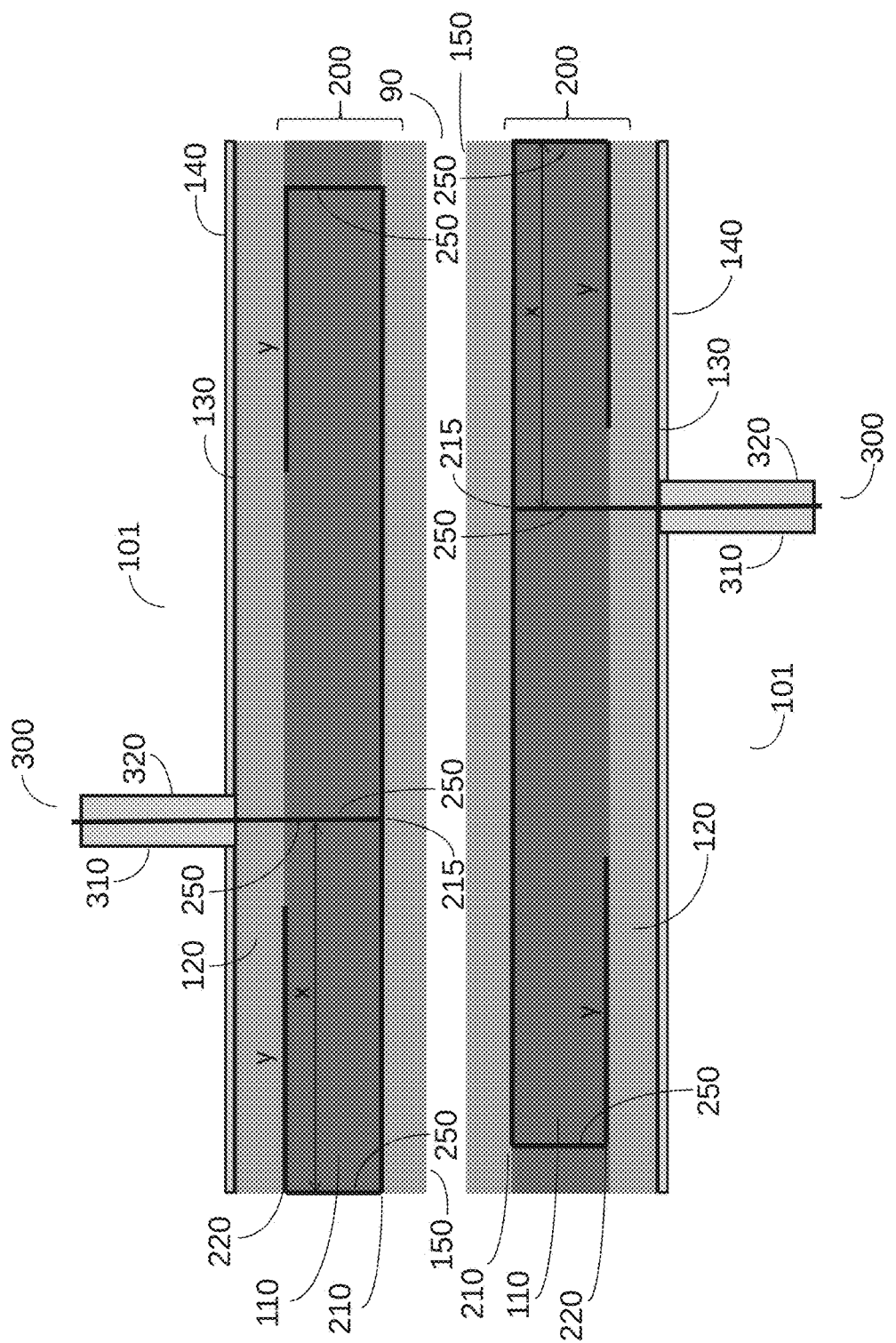
FIG. 3 illustrates a cross sectional view of two couplers facing each other, containing half-wavelength dipole antennas and interfacing to two coaxial cables.

Other suitable antenna structures in accordance with an exemplary embodiment are illustrated in FIG. 3, which illustrates a possible solution using half-wavelength dipoles. FIG. 3 is essentially a sectioned side view of two couplers 101 facing each other across the gap 90. In the case of circular couplers 101, FIG. 3 may be interpreted as a flattened view. In that case, the left edge of FIG. 3 would be connected to its right edge. The shade coding is identical to that of FIGS. 1 and 2: Dark shading for the dielectric substrates 110, light shading for the encapsulations 120. Based on half-wavelength dipoles, the structures are highly symmetric, with all dipole ends terminating in rear-facing structures, labeled "y". The dipole lengths, which include the lengths "y," are chosen such that the dipoles resonate at the desired operating frequency. Frequency tuning is accomplished by adjusting the lengths and/or the widths of rear-facing structures 220, labeled "y". Increasing the lengths "y" results in lower dipole resonance frequencies; decreasing the lengths "y" results in higher dipole resonance frequencies. Frequency tuning can also be accomplished by adjusting the lengths and/or the widths of the front-facing antenna structures 210. Frequency tuning may also be accomplished by adjusting the dielectric constant(s) of the substrates 110 and/or the encapsulations 120. Such adjustment of the dielectric constant(s) may be accomplished by "loading" a thermoplastic such as PEEK with ballast material(s) with different dielectric constant(s).

As with the embodiment of FIG. 2, the attached cables 300 are typically of one of several standard characteristic impedances. The cables may have a characteristic impedance of 50 Ohm or may have a characteristic impedance of 75 Ohm. Other values for the characteristic impedance are also possible. Matching the dipoles' input/output impedances to the impedances of the attached cables 300 is accomplished by adjusting the distances "x" that governs the position of the attachment points 215 of the cables' inner conductors (by means of vias 250). The range of possible adjustments is about 20 Ohm to 100 Ohm, which covers all commercial types of coaxial cable. The cable shields 310 are attached to the coupler shields 130 that in turn are connected to the structures 220. The cables' inner connectors 320 are electrically connected to the structures 210 by means of vias 250.

It is a trivial to generalize FIG. 3 to cases of arbitrary numbers of dipoles, starting at one dipole per coupler as shown in FIG. 3. If there are more than one dipole per coupler, cables are "bundled". Within a bundle of cables that are all attached to the same coupler 101, the normal case (i.e., no failure has occurred) would be that all cables carry essentially identical copies of the same signal. If a failure occurs in a dipole and/or in a cable 300, the signal still reaches its destination by means of the remaining, intact antenna/cable combination(s).

Figure 4:
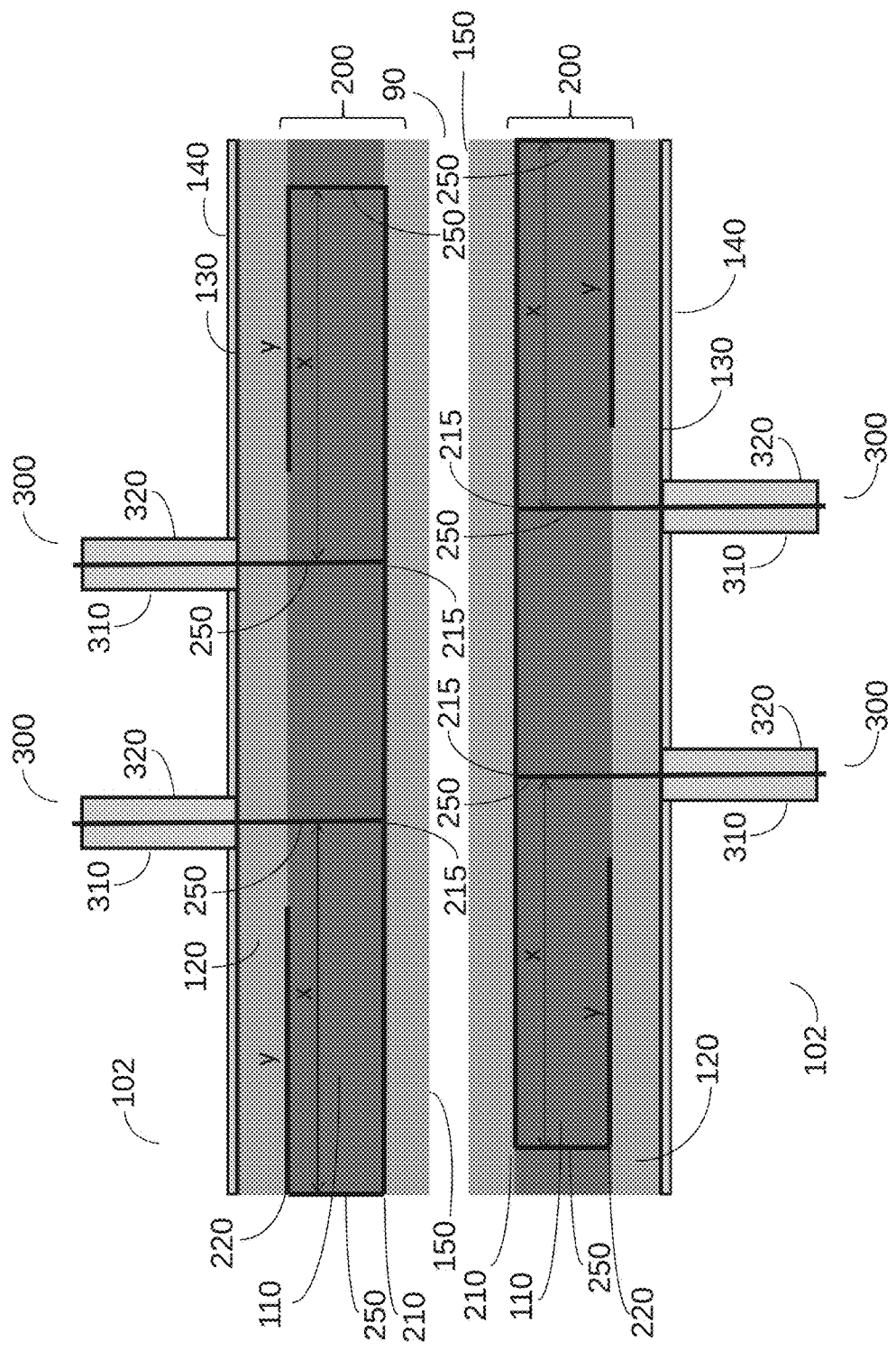
FIG. 4 illustrates a cross sectional view of two couplers facing each other, containing half-wavelength dipole antennas and interfacing to four coaxial cables.

Yet other suitable antenna structures in accordance with an exemplary embodiment are illustrated in FIG. 4, illustrating yet another possible solution using a half-wavelength dipole. FIG. 4 is essentially a sectioned side view of two couplers 102 facing each other across the gap 90. In the case of circular couplers 102, FIG. 4 may be interpreted as a flattened view. In that case, the left edge of FIG. 4 would be connected to its right edge. The shade coding is identical to that of FIGS. 1-3: Dark shading for the dielectric substrates 110, light shading for the encapsulations 120. Based on half-wavelength dipoles, the structures are highly symmetric, with all dipole ends terminating in identical rear-facing structures, labeled "y". The dipole lengths, which include the lengths "y," are chosen such that the dipoles resonate at the desired operating frequency. Frequency tuning is accomplished by adjusting the lengths and/or the widths of rear-facing structure, labeled "y". Frequency tuning may also be accomplished by adjusting the dielectric constant(s) of the substrates 110 and/or the encapsulations 120. Such adjustment of the dielectric constant(s) may be accomplished by "loading" a thermoplastic such as PEEK with ballast material(s) with different dielectric constant(s).

As with FIGS. 2 and 3, the attached cables 300 are typically of one of several standard characteristic impedances. The cables may have a characteristic impedance of 50 Ohm or may have a characteristic impedance of 75 Ohm. Other values for the characteristic impedance are also possible. Matching the dipoles' input/output impedances to the impedances of the attached cables 300 is accomplished by adjusting the distances "x" that governs the position of the attachment points 215 of the cables' inner conductors (by means of vias 250). The range of possible adjustments is about 20 Ohm to 100 Ohm, which covers all commercial types of coaxial cable. The cable shields 310 are attached to the coupler shields 130 that in turn are connected to the structures 220. The cables' inner connectors 320 are electrically connected to the structures 210 by means of vias 250.

In the exemplary arrangement shown in FIG. 4, pairs of cables 300 carry complementary, i.e. inverted and non-inverted signals. The two cables attached to the same antenna carry signals that are phase-inverted relative to each other, but are otherwise essentially identical. This is particularly advantageous in cases where redundancy is desired. If one of the cables fails, the signal would still reach its destination through the remaining, intact cable. Care must be taken not to confuse the dual-cable redundancy of FIG. 2 with that of FIG. 4. In the former case, redundant signals are essentially identical; in the latter, they are essentially complementary. Attaching a pair of cables to the wrong coupler may lead to signal cancellation.

It is a trivial to generalize FIG. 4 to cases of arbitrary numbers of dipoles, starting at one dipole per coupler as shown in FIG. 4. If there are more than one dipole per coupler, cable pairs are "bundled". Within a bundle of cables that are all attached to the same coupler 102, the normal case (i.e., no failure has occurred) would be that one-half of the cables carry straight signal copies and one-half of the cables carry complementary, i.e. phase-reversed signal copies. If a failure occurs in a dipole and/or in a cable 300, the signal still reaches its destination by means of the remaining, intact antenna/cable combination(s). The term "bundle of cables" only relates to the electrical configuration. Mechanically, it may very well be advantageous to separate cables within the same bundle as much as possible from each other in order to minimize the probability that more than one cable is damaged during deployment.

As can be seen from FIGS. 1-4, the functionality of the electromagnetic resonant couplers of U.S. Pat. No. 8,941,384 with their "capacitor blocks" has been subsumed into the geometry of novel antenna structures. These structures provide desirable near-field coupling characteristics, combined with frequency tunability and cable-matching capability. For example, the desired operating frequency is "programmed" into the couplers mainly by adjusting the structures or distances "y", which is a purely geometrical/lithographical process. Similarly, matching the cable impedance(s) is "programmed" mainly by adjusting the structures or distances "x", again a purely geometrical/lithographical process.

For the sake of simplicity and for ease of understanding, FIGS. 2-4 have been drawn with the cables 300 directly and permanently attached to couplers 100, 101, or 102. As would be obvious to anybody schooled in the art, these connections may be made non-permanent or otherwise modified. For example, cable jacks may be installed in the couplers 100, 101, or 102 that electrically connect to the antenna structures 200. The ends of cables 300, fitted with cable connectors, may be inserted into these jacks for permanent or non-permanent electrical and mechanical connections. Conversely, the couplers 100, 101, or 102, may be fitted with rigid sections, electrically acting as coaxial cables. Such "pins" or "plugs" may be inserted into female cable connectors attached to cables 300 for permanent or non-permanent electrical and mechanical connections. All such cable attachment methods are subsumed within the scope of the claims set forth below.

Figure 5:
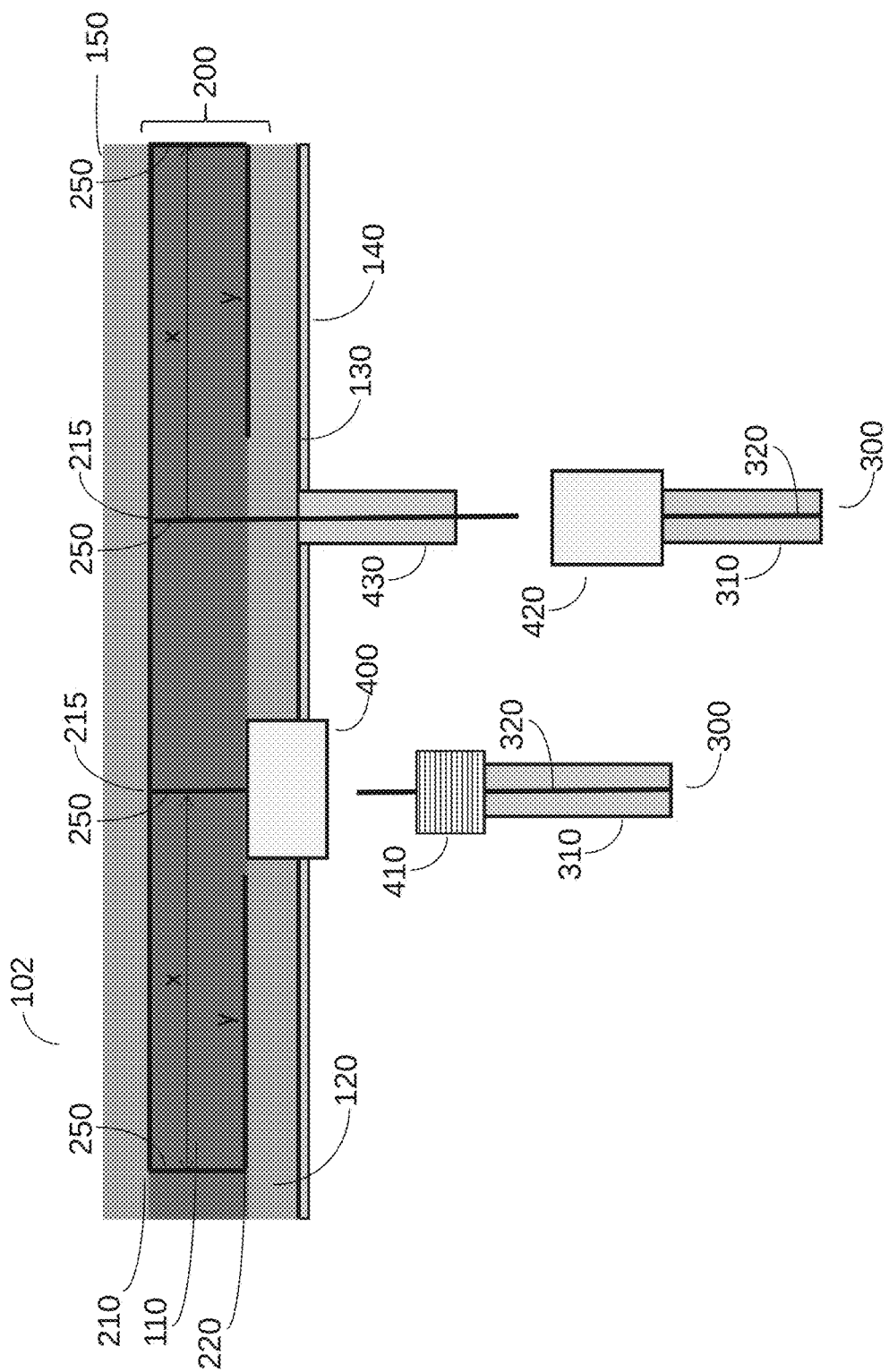
FIG. 5 illustrates two alternative cable attachment methods, using a coupler according to FIG. 4 as an example.

By way of example, FIG. 5 illustrates a combination of "plug" and "pin" attachment on a coupler 102 according to FIG. 4. A radiofrequency jack 400 with controlled characteristic impedance is installed in coupler 102 and is electrically connected to the antenna structure 200 and to the shield 130. The left cable 300 is fitted with a cable connector 410 that interfaces with the jack 400. The right cable 300 is fitted with a female cable connector 420 that interfaces with the coaxial pin structure 430 that is permanently attached to and made a part of coupler 102. The pin 430 has a controlled characteristic impedance and is electrically connected to the antenna structure 200 and to the shield 130. Such mix-and-match combinations of "pin" and "plug" as illustrated in FIG. 5 may be helpful in keeping apart complementary signals as they may be present on a coupler 102. Such combinations may also be helpful in avoiding confusion between couplers of the type 100 and 102.

Figure 6B:
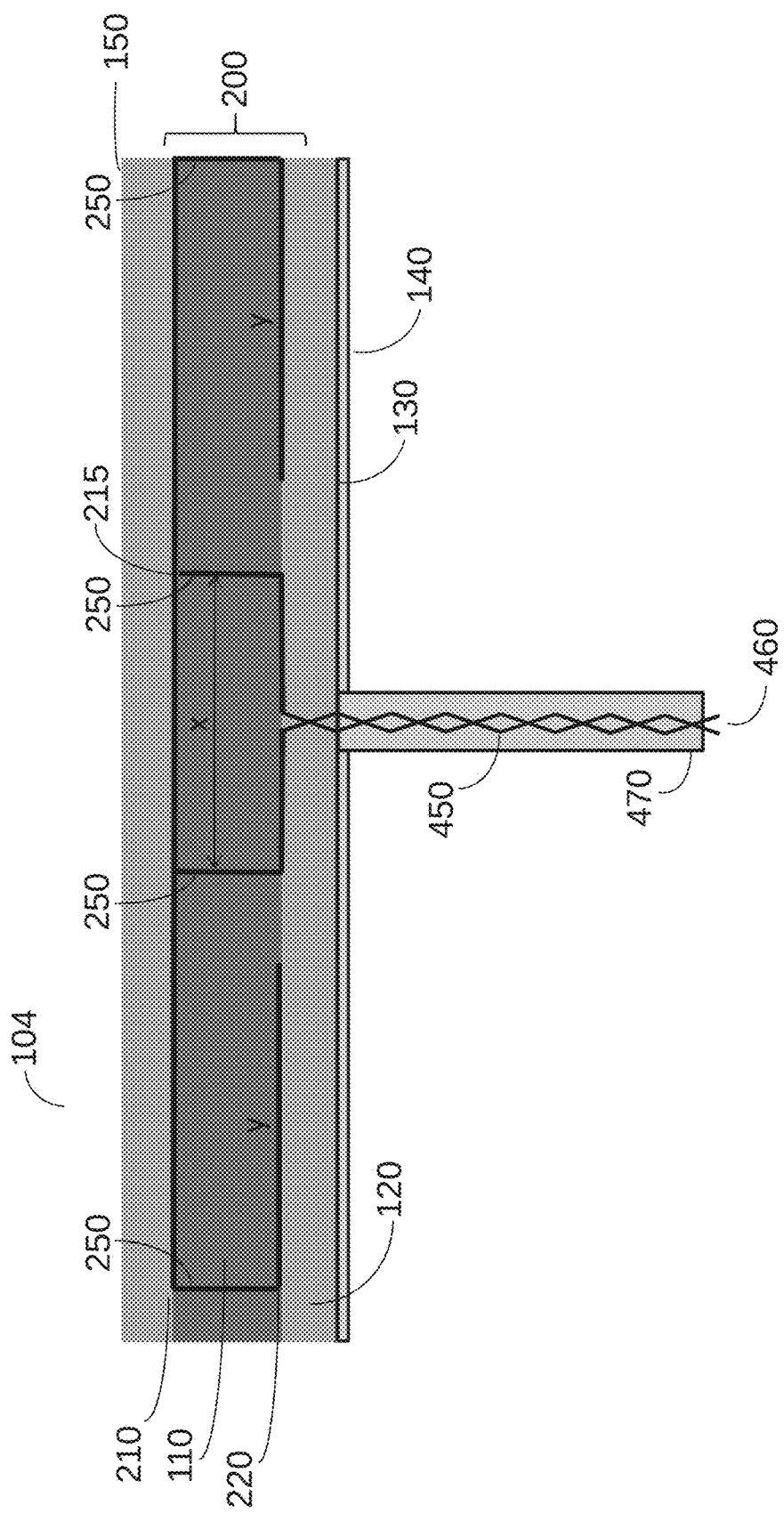
FIG. 6b illustrates the use of unshielded or shielded twisted-pair cables with a coupler containing half-wavelength dipole antennas.

FIGS. 6a and 6b illustrate the use and attachment methods of twisted-pair cable(s) instead of coaxial cable(s). These methods take advantage of the fact that complementary signals may be generated by rearranging the electric dipoles or by tapping them at different attachment points 215. These signals are internally (as shown in FIGS. 6a and 6b) or externally brought together to connect to a twisted wire pair 450. This wire pair 450 is at the core of the twisted-pair cable 460, which may be of the unshielded (UTP) or the shielded type (STP). In the latter case (STP), the cable shield 470 is electrically connected to the coupler shield 130. A characteristic impedance of a twisted-pair cable 460 may be 100 or 120 Ohm. Generally, STP cable has a lower impedance than UTP cable of similar diameter.

FIG. 6a details the case of quarter-wavelength electric dipoles and FIG. 6b details the case of half-wavelength electric dipoles. In the case of quarter-wavelength dipoles, a pair of dipoles is formed by mirroring one dipole and arranging the paired dipoles back-to-back as shown in FIG. 6a. The characteristic impedance of the coupler 103 is "programmed" by means of adjusting the parameters "x" to one-half of the impedance of the twisted-pair cable attached at each of the vias 250. In sum, the two via impedances add up to the desired twisted-pair impedance.

By recognizing the inherent symmetry of the antenna arrangement 200, a simplification can be achieved as shown in FIG. 6b. The two quarter-wavelength dipoles may be joined to form a half-wavelength dipole. The characteristic impedance of the coupler 104 is "programmed" by means of adjusting the parameter "x" to the impedance of the twisted-pair cable attached at each of the vias 250. The art of attaching twisted-pair cables may be combined with the art of various cable attachments by means of various connectors as described above in the context of coaxial cable. Obviously, there are a myriad of combinations possible of which only a few examples could be discussed above. Nevertheless, all combinations fall within the scope of the claims.

The use of shielded twisted-pair cable offers protection against failures via cable redundancy. In the normal case (i.e., no failure has occurred), the conductors in the twisted pair 450 carry inverted and non-inverted copies of the same signal, which leaves the shield 470 without a net signal. In case of a failure in either the inverted or the non-inverted path, the resultant imbalance energizes the coupler shield 130 and hence the cable shield 470, forming a return path for the remaining signal.

It is a trivial to generalize FIGS. 6a and 6b to cases of arbitrary numbers of dipoles and twisted-pair cables, starting at one dipole per coupler as shown in FIGS. 6a and 6b. If there are more than one dipole per coupler, twisted-pair cables are "bundled" in analogy to the cases of coaxial cables described above.

A characteristic feature common to all cable attachment methods described herein is the absence of discrete impedance-matching components between the antennas 200 and the cables 300. This very desirable feature greatly aids reliability under downhole conditions as it removes discrete, failure-prone components such as capacitors, inductors, radiofrequency transformers, baluns (balanced/unbalanced converters), and the like. One possible solution is to set the characteristic impedance directly to that of the cable 300 or 460 by means of pre-adjusting the parameter "x". In this case, all connector components need to also have this pre-set characteristics impedance, e.g., 50 Ohm or 75 Ohm. Another possible solution may take into account, for example, differences between the characteristic impedance of the cable 300 or 460, the jack 400 and/or the cable connector 410. In such a case, the corresponding parameter "x" would be programmed to compensate for these differences by nulling out an impedance mismatch by another impedance mismatch that is purposefully introduced by the setting "x". Obviously, a coupler with a particular setting "x" would only work with the particular cable attachment hardware it is designed for.

Figures 7A, 7B:
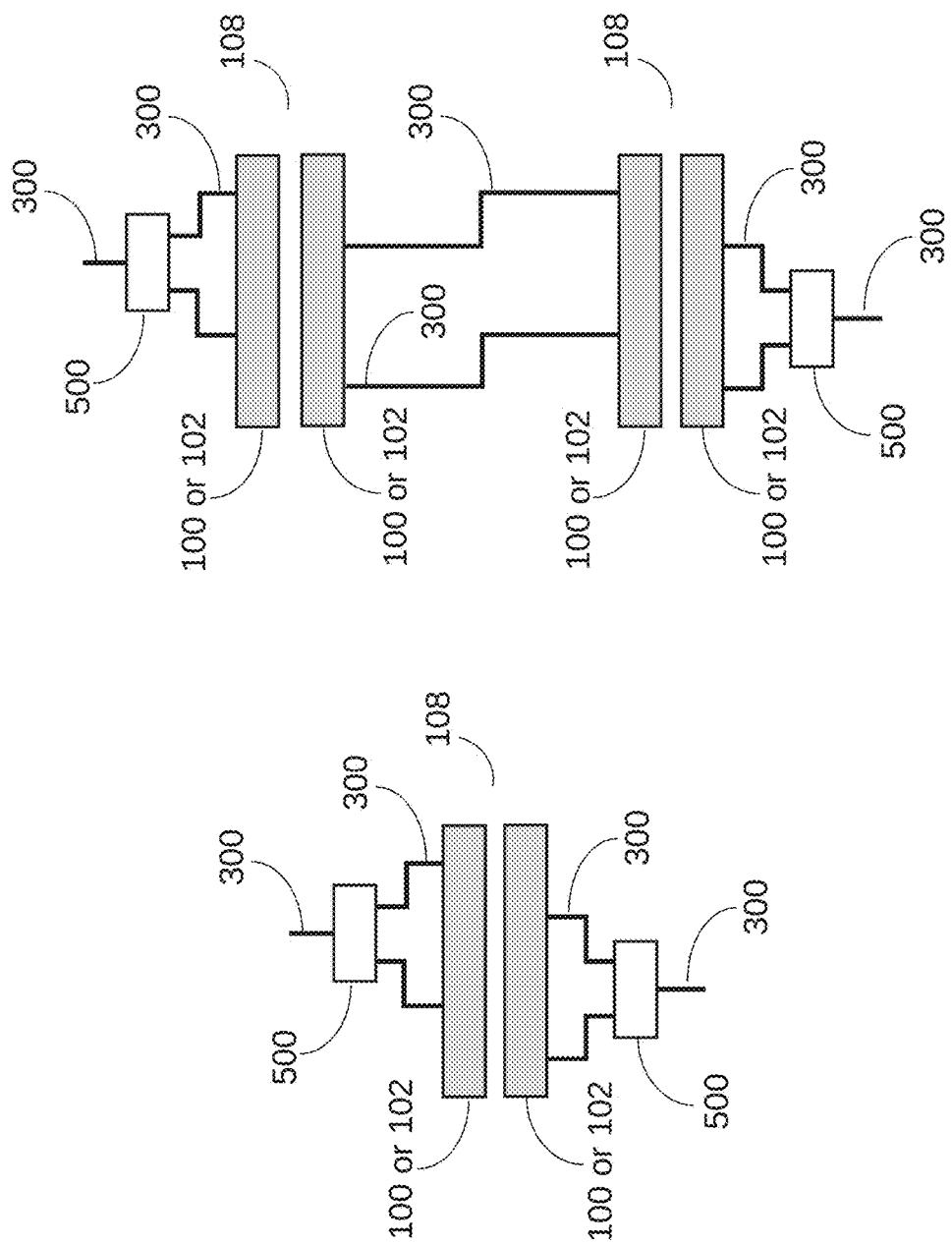
FIG. 7a illustrates a schematic using a coupler pair and splitter/combiner devices in a non-redundant scheme.
FIG. 7b illustrates a schematic using coupler pairs and splitter/combiner devices in a redundant scheme.

FIGS. 7a and 7b illustrate the generation of multiple, identical signals as required by couplers of type 100 (in case coupler 100 contains more than one dipole as shown in FIG. 2) and type 102 (FIG. 4). In these examples, radiofrequency splitter/combiners 500 are used to (a) generate multiple copies of a signal, and to (b) combine multiple copies of a signal into one. Suitable radiofrequency splitter/combiners are available from Mini-Circuits, Brooklyn, N.Y. 11235. In the case of couplers 100 with two internal dipoles per coupler, the splitter/combiners 500 would be of the type "2-way, 0-degree". In the case of couplers 102, the splitter/combiners 500 would be of the type "2-way, 180-degree". Obviously, the case of a coupler 100 with just one dipole per coupler does not require a splitter/combiner 500.

FIG. 7a is the simplest case, where one signal is split into two identical (or complementary) components, fed through a coupler pair 108 made from couplers 100 or 102, and is then recombined. FIG. 7b illustrated a more complex case, where the signal is carried between couplers 100 or 102 on two (or more) cables 300 in parallel. This configuration is adventurous in cases where signal transport redundancy is desired for a portion of a longer transmission path, such as through a downhole component where cable damage occurs more frequently than someplace else. Unfortunately, components such as splitter/combiners 500 are rather fragile, are typically not fit for downhole use and tend to fail under the combined stresses of temperature, shock and vibration.

FIGS. 8a-8c illustrate how combinations of couplers according to the exemplary embodiments may be used to implement a wide variety of common passive, linear radiofrequency conversion functions while avoiding discrete components such as discrete splitter/combiners. FIG. 8a shows how "hybrid" coupler pairs 108 may be formed, in this case between types 100 and 101. Couplers 101 receive/transmit via single cables 300, while couplers 100 interface to multiple, parallel cables 300. Thus, radiofrequency signal splitting is accomplished within the very robust coupler structures themselves, eliminating additional components and hence greatly increasing overall reliability under downhole conditions. Since the hybrid coupler pairs 108 are bi-directional, they can be used without modification as radiofrequency combiners, as indicated in FIG. 8a, bottom.

FIG. 8b illustrates the similar case of a "hybrid" coupler pair 108 made from type 101 and 103 (or 104) couplers. Here, the function of a radiofrequency "balun" ("balanced/unbalanced") device is implemented to transform back and forth between unbalanced coaxial cable(s) 300 and balanced twisted-pair cable(s) 460. Feeding an unbalanced signal into coupler 101 causes coupler 103 (or 104) to generate balanced signals on the twisted-pair cable(s) 460. Alternatively, the balanced and complementary signals could be transported by a pair of parallel coaxial cables. As illustrated in FIG. 8b (bottom), such balanced signals (either on parallel coaxial cables or on twisted-pair cables) can be transformed back into unbalanced form by another hybrid coupler pair 108. The function of the hybrid coupler pairs 108 of FIG. 8b may also be understood as that of a radiofrequency splitters/combiners/inverters, since the generation of balanced, complementary signal pairs necessarily involves the generation of at least one non-inverted copy and one inverted copy of an input signal.

FIG. 8c illustrates the use of coupler pairs 108 as impedance transformation devices. The top coupler 101, 103 or 104 is matched to a cable impedance $Z_1$ by means of parameter $x=x_1$, while the bottom coupler 101, 103 or 104 is matched to a cable $Z_2$ by means of a parameter $x=x_2$. Example values may be $Z_1=50$ Ohm and $Z_1=75$ Ohm. The impedance transform operates bi-directionally, i.e. up-transforming and down-transforming are possible using identical devices by simply interchanging inputs and outputs. The interactions between the parameters "x" and "y" makes it necessary to also adjust the parameters "y" in order for all dipoles to operate within the same frequency band. For simplicity, this detail has been omitted from FIG. 8c. By setting $x=x_1=x_2$, follows the trivial case of a "straight-through" coupler pair without impedance transform.

The functionality of an impedance transformer may be freely combined with the functionality of a splitter/combiner as shown in FIG. 8a, i.e. signal splitting/combining is performed simultaneously with (an) impedance transformation(s). The functionality of an impedance transformer may also be freely combined with the functionality of a balun device as shown in FIG. 8b, i.e. coaxial-to-twisted-pair transformation is performed simultaneously with (an) impedance transformation(s). This fact is already apparent by considering that a typical characteristic impedance of a coaxial cable may be 50 Ohm, while a typical characteristic impedance of twisted-pair cable may be 120 Ohm. Furthermore, the functionalities of coupler pairs 108, as shown by example in FIGS. 8a-8c, may all be freely combined to perform complex transformations between variable types of cables and numbers of cables.

FIG. 9 illustrates how a pair of circular couplers 100, 101, 102, 103 and/or 104 may be arranged such that they are rotatably movable against each other. Coupler types 100, 101, 102, 103 and/or 104 may be freely intermixed within such a coupler pair 108. In this particular example, two cables 300 or 460 are attached to each coupler. Fewer or more cables may also be used, possibly in combination with splitter/combiner circuits in FIGS. 7a and 7b, or utilizing the inherent splitter/combiner functionalities described above. Any and all of the conversion functions exemplified in FIGS. 8a-8c may be employed with rotatably movable couplers, such as splitters, combiners, inverters, (un)balancers, and impedance transformers.

Figure 10:
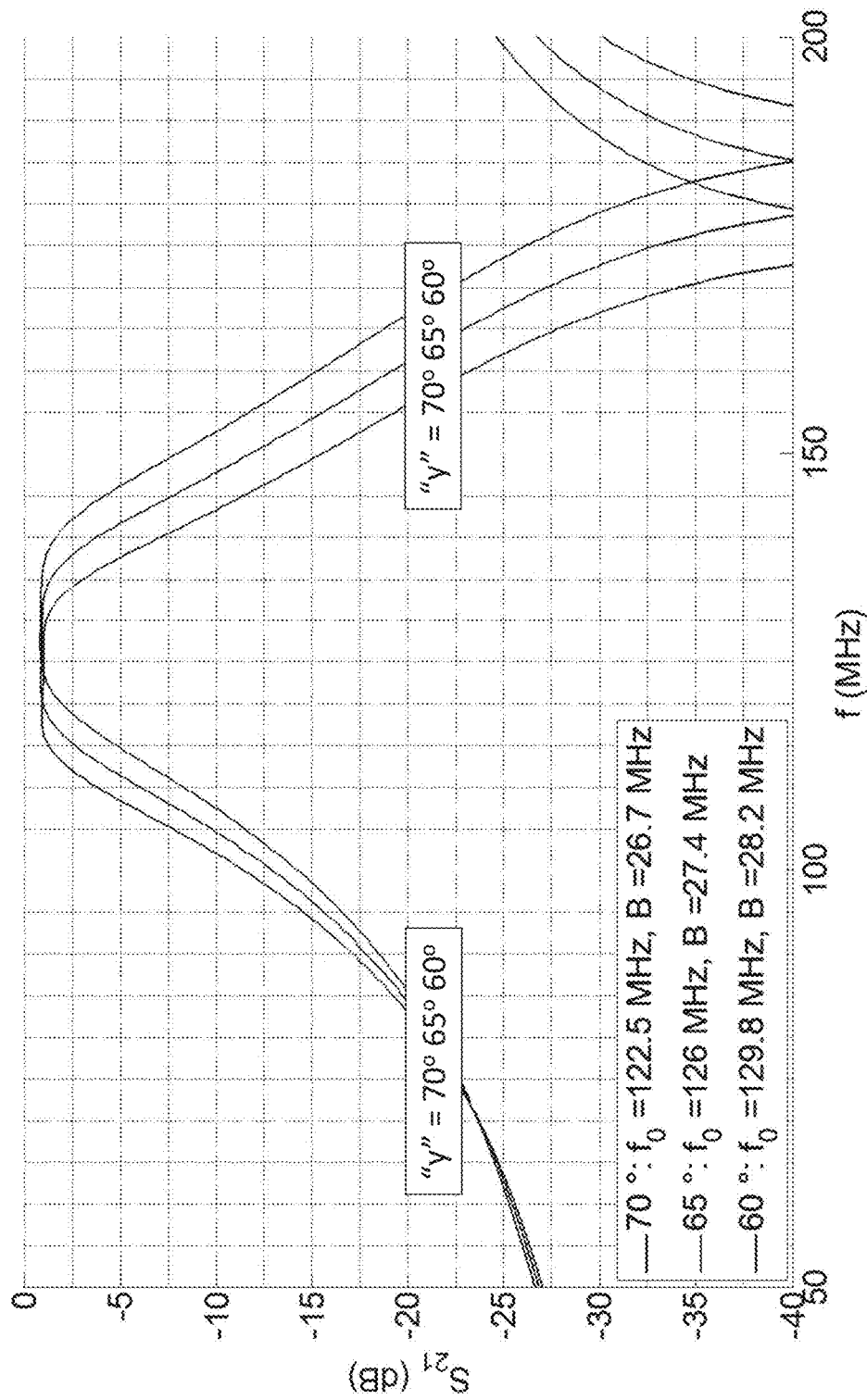
FIG. 10 illustrates the signal transfer characteristics of a circular coupler pair, demonstrating the frequency-tuning characteristics of parameter "y".

FIG. 10 illustrates exemplary signal and/or power transfer characteristics of a circular coupler pair 108 arranged as shown in FIGS. 1, 2, 7a and 9. The coupler diameter is 100 mm. All four dipoles are of the quarter-wavelength type. On the x-axis is shown the frequency in MHz, and on the y-axis the cable-to-cable attenuation in decibels (dB). The three curves have been obtained by numerical simulation to show the frequency-tuning characteristics of the parameter "y". All three curves show a flat passband with minimal attenuation. The passband's center frequency depends on "y" as indicated in the legend box, lower left in FIG. 10. The parameter "x" has been constant for a cable-match impedance of 50 Ohm. An increase of 5 degrees in "y" length (which is approximately 4.4 mm at a diameter of 100 mm) causes a decrease in center band frequency of about 4 MHz. The low passband attenuation, coupled with the large bandwidth B of more than 26 MHz, render the construction very well suited as a coupler structure.

From FIGS. 1-6b and FIG. 9 it is clear that the couplers 100, 101, 102, 103 or 104 need not be mechanically fixed relative to each other, but may move relative to each other in the direction of the long axes of the substrates without disrupting signal and/or power transfer. If the substrates are rings, as shown in FIG. 9, the couplers may freely rotate against each other. This feature is very useful in constructing signal and/or power links between a stator and a rotor of a machine or a downhole piece of equipment.

If the substrates are straight structures, as shown in FIG. 11, the couplers 100, 101, 102, 103 or 104 may freely translate against each other without disrupting signal and/or power transfer. This feature is useful in constructing signal and/or power links between elements of a machine or a downhole piece of equipment that are translatable against each other. An example would be a drilling jar. Typically, 1-3 drilling jars are deployed in any given drill string and need to be instrumented with communications elements such as cables and couplers to work in a chain of wired-pipe downhole equipment. The couplers 100, 101, 102, 103 or 104 need to be able to accommodate the jar's operation that, when triggered, releases a spring that forcefully moves two parts of the jar linearly against each other to create a hammer-on-anvil effect. Coupler types 100, 101, 102, 103 and 104 may be freely intermixed within such a coupler pair 108. In this example, two cables 300 or 460 are attached to each coupler. Fewer or more cables may also be used, possibly in combination with splitter/combiner circuits in FIGS. 7a and 7b, or utilizing the inherent splitter/combiner functionalities described above. Any and all of the conversion functions exemplified in FIGS. 8a-8c may be employed with linearly movable couplers, such as splitters, combiners, inverters, (un)balancers, and impedance transformers.

The absence of discrete, voltage-sensitive components such as capacitors and/or inductors, coupled with encapsulation using high-dielectric strength materials makes it possible to dramatically increase the voltages and electric field strengths surrounding the dipoles. The highest field strengths exist at the open tips of the dipoles, amplified by the high local curvature of the dipole-forming structures 200, in particular the open ends of 220. As an example, unfilled PEEK, as supplied by Technical Products Inc., Hubertus, Wis., is specified with a dielectric strength of 480 V per mil (1 mil=25.4 micrometer). As can be seen from FIGS. 1-7, the internal coupler structure can be devised with dielectric thicknesses of no less than about 1 mm, implying internal voltage handling capabilities of several kilovolts. Thus, the power-handling capabilities of couplers 100, 101, 102, 103 and 104 are determined to a lesser extent by voltage limitations, but rather by limitations on the operating temperature that is the sum of ambient temperature plus self-heating temperature due to power losses. As an example, a coupler pair 108 transmitting 100 W radiofrequency power experiences about 1 dB power loss per coupler, equal to about 20 W. These 20 W need to be absorbed by the coupler's surroundings without causing excessive self-heating. Such conditions are typically fulfilled in machinery suitable for downhole use.

It should be understood that the claims set forth below are not limited to the particular embodiments disclosed, but are intended to cover modifications within the spirit and scope as defined in the appended claims. For example, there is no requirement to limit the number of dipoles per coupler or to arrange them in a particular order. Dipoles may be arranged in circular, straight or any other lines, or even in 2-dimensional arrays. Coupler structures of virtually limitless variations and sizes may be realized. All such variations are intended to be covered by the appended claims.

What is claimed:

1. A system for downhole wired-pipe communication and/or power transmission using signal and/or power couplers, comprising:
   a first coupler comprising a first dielectric substrate, a first electric dipole arranged on said first dielectric substrate, first dielectric encapsulation surrounding said first dielectric substrate and said first electric dipole, and a first electric shield surrounding said first dielectric encapsulation; and
   a second coupler comprising a second dielectric substrate, a second electric dipole arranged on said second dielectric substrate, second dielectric encapsulation surrounding said second dielectric substrate and said second electric dipole, and a second electric shield surrounding said second dielectric encapsulation,
   wherein said first electric dipole and said second electric dipole are adapted to exchange radiofrequency signals and/or electrical power at radiofrequencies with each other by means of near-field dipole-dipole interaction.

2. A system as in claim 1, wherein said first electric dipole and second electric dipole are not directly electrically connected to a capacitor or to an inductor.

3. A system as in claim 1, wherein said first electric dipole and said second electric dipole are directly electrically connected to first and second cables, respectively, said first and second cables carrying said radiofrequency signals and/or said electrical power.

4. A system as in claim 1, wherein at least one of said first and second electric dipoles is of the quarter-wavelength dipole type.

5. A system as in claim 1, wherein at least one of said first and second electric dipoles is of the half-wavelength dipole type.

6. A system as in claim 1, wherein said radiofrequency signals are in the HF, VHF or UHF frequency ranges.

7. A system as in claim 1, wherein said electrical power is exchanged in the HF, VHF or UHF frequency ranges.

8. A system as in claim 1, wherein said first and second dielectric substrates form generally circular rings.

9. A system as in claim 8, wherein said first coupler is adapted to be rotatably movable against said second coupler.

10. A system as in claim 1, wherein said first and second dielectric substrates form generally linear structures.

11. A system as in claim 10, wherein said first and second couplers are adapted to be linearly movable against each other.

12. A system as in claim 1, wherein at least one of said first and second couplers is adapted to be connected to one or more coaxial cables.

13. A system as in claim 12, wherein said at least one of said first and second couplers is adapted to be connected to first and second coaxial cables carrying complementary signals.

14. A system as in claim 12, wherein said first and second coaxial cables are connected to said at least one of said first and second couplers via a plug and pin attachment on said at least one of said first and second couplers.

15. A system as in claim 12, wherein said one or more coaxial cables is/are integrated into said at least one first and second coupler.

16. A system as in claim 1, wherein at least one of said first and said couplers is adapted to be connected to one or more twisted-pair cables.

17. A system as in claim 16, wherein said one or more twisted-pair cables is/are integrated into said at least one first and second coupler.

18. A system as in claim 16, wherein said one or more twisted-pair cables comprise shielded twisted-pair type cables configured such that a failure in one of said twisted-pair cables does not lead to a catastrophic loss of signal and/or power.

19. A system as in claim 1, wherein at least one of said first and second couplers is adapted to be connected to a plurality of cables configured such that a failure in one or more of said first and second electric dipoles and/or a failure in one or more of said cables does not lead to a catastrophic loss of signal and/or power.

20. A system as in claim 1, wherein said first and second couplers form a coupler pair adapted to perform radiofrequency splitter/combiner functions.

21. A system as in claim 1, wherein said first and second couplers form a coupler pair adapted to perform radiofrequency splitter/combiner/inverter functions.

22. A system as in claim 1, wherein said first and second couplers form a coupler pair adapted to perform radiofrequency balanced/unbalanced transform functions.

23. A system as in claim 1, wherein said first and second couplers form a coupler pair adapted to perform impedance transform functions.

24. A method for downhole wired-pipe communication and/or power transmission using signal and/or power couplers, comprising:

arranging a first coupler comprising a first dielectric substrate, a first electric dipole arranged on said first dielectric substrate, first dielectric encapsulation surrounding said first dielectric substrate and said first electric dipole, and a first electric shield surrounding said first dielectric encapsulation with respect to a second coupler comprising a second dielectric substrate, a second electric dipole arranged on said second dielectric substrate, second dielectric encapsulation surrounding said second dielectric substrate and said second electric dipole, and a second electric shield surrounding said second dielectric encapsulation whereby said first and second couplers are separated by a gap; and exchanging radiofrequency signals and/or electrical power at radiofrequencies between said first electric dipole and said second electric dipole by means of near-field dipole-dipole interaction.

25. A method as in claim 24, wherein said first electric dipole and second electric dipole exchange radiofrequency signals and/or electrical power without being directly electrically connected to a capacitor or to an inductor.

26. A method as in claim 24, further comprising directly electrically connecting first and second cables that carry said radiofrequency signals and/or said electrical power to said first electric dipole and said second electric dipole, respectively.

27. A method as in claim 24, wherein said radiofrequency signals are transmitted in the HF, VHF or UHF frequency ranges.

28. A method as in claim 24, wherein said electrical power is exchanged in the HF, VHF or UHF frequency ranges.

29. A method as in claim 24, wherein said first and second dielectric substrates form generally circular rings, further comprising rotatably moving said first coupler against said second coupler.

30. A method as in claim 24, wherein said first and second dielectric substrates form generally linear structures, further comprising linearly moving said first and second couplers against each other.

31. A method as in claim 24, further comprising connecting at least one of said first and second couplers to one or more coaxial cables.

32. A method as in claim 31, further comprising connecting said at least one of said first and second couplers to first and second coaxial cables carrying complementary signals.

33. A method as in claim 31, further comprising connecting said first and second coaxial cables to said at least one of said first and second couplers via a plug and pin attachment on said at least one of said first and second couplers.

34. A method as in claim 24, further comprising connecting at least one of said first and said couplers to one or more twisted-pair cables.

35. A method as in claim 34, further comprising connecting at least one of said first and second couplers to a plurality of cables configured such that a failure in one or more of said first and second electric dipoles and/or a failure in one or more of said cables does not lead to a catastrophic loss of signal and/or power.

36. A method as in claim 24, further comprising arranging said first and second couplers to form a coupler pair performing radiofrequency splitter/combiner functions.

37. A method as in claim 24, further comprising arranging said first and second couplers to form a coupler pair performing radiofrequency splitter/combiner/inverter functions.

38. A method as in claim 24, further comprising arranging said first and second couplers to form a coupler pair performing radiofrequency balanced/unbalanced transform functions.

39. A method as in claim 24, further comprising arranging said first and second couplers to form a coupler pair performing radiofrequency impedance transform functions.

* * * * *